United States Patent [19]

von Tiesenhausen

[11] Patent Number: 4,582,277

[45] Date of Patent: Apr. 15, 1986

[54] MAGNETIC SPIN REDUCTION SYSTEM FOR FREE SPINNING OBJECTS

[75] Inventor: Georg F. von Tiesenhausen, Huntsville, Ala.

[73] Assignee: The United States of America as represented by the Administrator of the National Aeronautics and Space Administration, Washington, D.C.

[21] Appl. No.: 643,522

[22] Filed: Aug. 23, 1984

[51] Int. Cl.⁴ .............................................. B64G 1/64
[52] U.S. Cl. ................................................... 244/161
[58] Field of Search .................... 244/158 R, 161, 165, 244/166, 172; 335/216

[56] References Cited

U.S. PATENT DOCUMENTS

| | | | |
|---|---|---|---|
| 3,003,356 | 10/1961 | Nordsieck | 244/165 |
| 3,017,777 | 1/1962 | Haeussermann | 244/166 |
| 3,048,350 | 8/1962 | Cutler | 244/166 |
| 3,478,986 | 11/1969 | Fogarty | 244/161 |
| 3,504,868 | 4/1970 | Engelberger | 244/172 |
| 4,260,187 | 4/1981 | Frosch et al. | 244/161 |

Primary Examiner—Galen L. Barefoot
Attorney, Agent, or Firm—Joseph H. Beumer; John R. Manning; Leon D. Wofford, Jr.

[57] ABSTRACT

A spinning earth satellite (19) is shown in which it is desired to reduce the rotation or spin to a level that the satellite (19) may be secured or handled remotely from a spacecraft. This is accomplished by the spacecraft (11) having a mast (13) carrying an electrical current carrying coil (17) which encircles the satellite (19). The magnetic field of the coil (17) is normal to the spin axis of the satellite (19) which causes circular eddy-current flow in the housing of the satellite which generates magnetic force opposing the rotation. In another embodiment the magnetic field is generated by the use of an electromagnet (49) on a remote manipulation arm (45).

4 Claims, 4 Drawing Figures

MAGNETIC SPIN REDUCTION SYSTEM FOR FREE SPINNING OBJECTS

ORIGIN OF THE INVENTION

The invention described herein was made by an employee of the United States Government and may be manufactured and used by or for the Government for governmental purposes without payment of any royalties thereon or therefor.

TECHNICAL FIELD

This invention relates to an apparatus and method of reducing the rotation rate of spinning or tumbling bodies, such as earth orbiting satellites, and more particularly to a magnetic system for use in space to cause counteracting eddy-currents in rotating metallic bodies which results in a counter-rotation magnetic torque which will reduce the spin rate of such bodies.

BACKGROUND ART

A spinning satellite with an operative attitude propulsion control system may easily by command cease its rotation. Also, slowly spinning satellites that are disabled can be boarded by an astronaut having a personal propulsion system to stop its rotation. For fast spinning satellites including tumbling satellites, that are uncontrolled or defective, there was no effective way heretofore to stabilize such satellites sufficiently such that they could be serviced or handled remotely from a spacecraft such as the space shuttle.

Accordingly, it is an object of the present invention to provide an apparatus that will magnetically bring a spinning or tumbling body under sufficient control that maintenance and servicing operations thereon may safely be carried out.

Another object is to provide a method for reducing the spin or tumbling of a free body that requires no physical contact with the body.

Yet another object is to provide a magnetic system for reducing the rotation rate of a free spinning or tumbling body by the induction of counteracting eddy-currents in the body.

Further objects will become apparent as the description of the invention proceeds.

SUMMARY OF THE INVENTION

In the present invention an apparatus is provided to place the free spinning body in a magnetic field that induces eddy-currents and thereby cause magnetic forces in the direction opposing the rotation of the body. The eddy-currents are normal to the magnetic field of the apparatus and experiences magnetic forces in the direction opposing the rotation of the body. Thus, the body experiences a counter rotation magnetic torque.

In one embodiment, a large diameter coil loop is used which fits easily around the spinning or tumbling body. The coil loop and its power supply are carried by a spacecraft such as the space shuttle orbiter or a robot like teleoperator maneuvering system In another embodiment, the remote manipulation arm of the space shuttle orbiter carries a magnet which positions it near and perpendicular to the axis of the body rotation or tumble.

BEST MODE FOR CARRYING OUT THE INVENTION

Figures 1, 3:
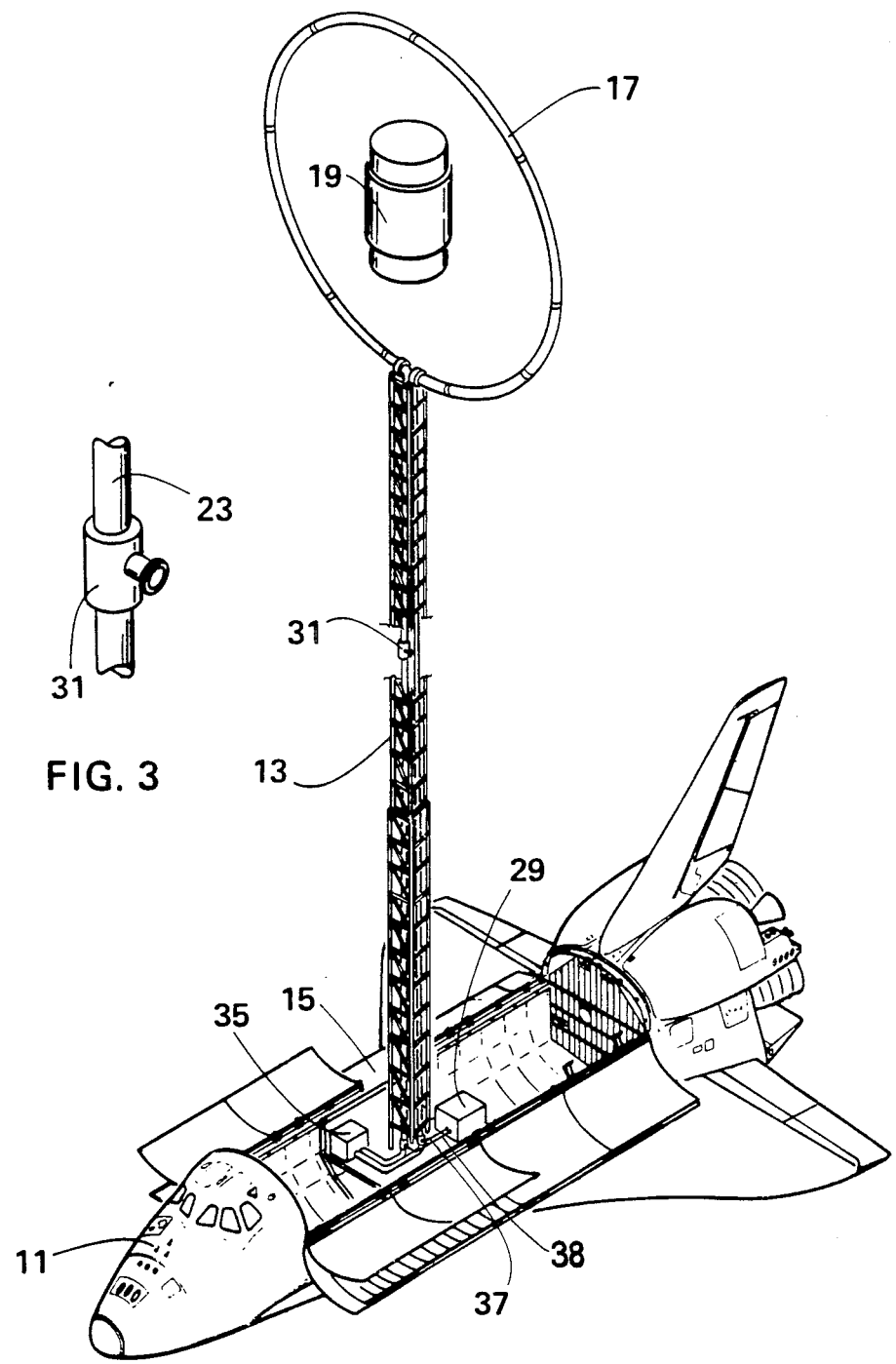
FIG. 1 is a pictorial view of the space shuttle orbiter with a collapsible mast supporting a magnetic coil that encircles a satellite. A portion of the mast is removed to reveal the cyrogenic cable lines.
FIG. 3 shows the pressure relief valve in the cable return line of FIG. 1.

Referring now to FIG. 1 wherein is shown the space shuttle orbiter 11 with a collapsible mast 13 extending from its payload bay 15 which mast has on its upper end a large loop 17 according to the present invention encircling a spinning satellite 19. The mast 13 is adapted to be stored together with the large loop 17 within the payload bay 15 and then erected for use. The mast 13 has a length of twenty to thirty meters and may have a plurality of telescoping sections or be a deployable lattice type.

Within or otherwise supported by the mast 13 are two runs 21, 23 of cable, having a plurality of insulated wires 25 therein (see FIG. 2), which are tied to the upper portion of the mast 13 by clamps 27 and have adequate rigidity to form a loop 17 to encircle the satellite 19. The cable runs 21, 23 and loop 17 have sufficient flexibility so as to be stored separate from the mast 13 in a folded manner, a figure-eight for example, in the payload bay 15. The astronauts of the orbiter 11 may by first attaching the loop 17 to the upper end of the mast 13 and then extending the mast 13 upwardly, feed the flexible cable 21, 23 within or along the mast 13 as it is erected. To better show the cable runs 21, 23 a portion of the mast in its middle section is removed in FIG. 1 for purposes of illustration.

The cable 21, 23 shown in adpated to contain a cyrogenic fluid or gas which is emitted from a suitable supply 29 carried in the payload bay 15 of the space shuttle 11 into the cable 21, 23 after erection. The return run 23 of the cable will have provision for a pressure relief valve 31 (FIG. 3) at suitable locations. A suitable cyrogenic fluid is liquid nitrogen or helium. The individual wires 25 within the cable are each insulated from each other. The cable jacket 33 (FIG. 2) is made of a multilayered material which provides very high insulating values when used with cyrogenic fluids.

A power supply 35 carried within the payload bay 15 of the orbiter 11 supplies the necessary electrical power to the individual wire 25 of the cable 21, 23. As illustrated supply and return lines 37, 38 from the cyrogenic supply 27 is joined to the cables 21, 23 to supply the cyrogenic fluid.

Figure 2:
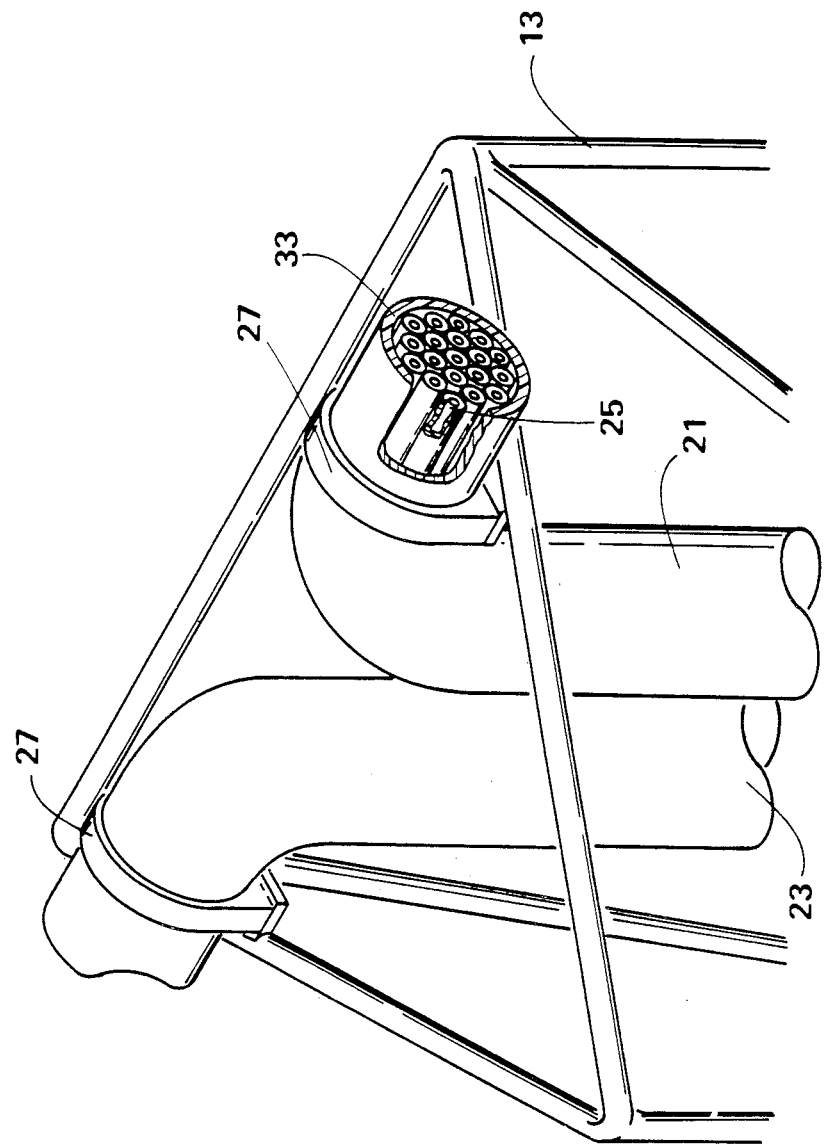
FIG. 2 is a pictorial view of the upper portion of the mast of FIG. 1.

While simpler, the use of a cable and wire not having cyrogenic cooling would impose a weight and power penalty. With cyrogenic cooling, for example, using a cable having 200 individual insulated wires (only eighteen are shown in FIG. 2) with each wire having a cross-sectional diameter of one millimeter, the total cross sectional diameter of the cable without the cooling jacket would be 1.4 cm and with the cooling insulated jacket the cable will have a diameter of 7.5 cm. The overall weight of a 10 foot coil without the lead cables thereto will be slightly less than two hundred pounds. Nevertheless, the simplicity of the cable without cyrogenic cooling will often make it the desirable choice.

In operation, the orbiter 11 is maneuvered into position such that the loop 17 encircles the spinning or tumbling satellite to be service. The orientation of the loop 17 should be such that the spin or tumbling axis of the satellite 19 lies in the plane of the loop 17. With this arrangement, eddy-currents flow in the metal of the satellite 19 which eddy-currents are normal to the magnetic field of the loop 17 and thereby cause magnetic forces in the direction opposing the rotation of the satellite. Thus, the satellite 17 experiences a counter-rotation magnetic torque which reduces its rotation, the kinetic energy of rotation being converted into heat created by the eddy-currents. It can be shown mathematically that the time to reduce the spin of a satellite rotating at 6 rpm may vary from 4 to 93 minutes depending on the satellite dimensions and strength of the magnetic field of the loop.

Figure 4:
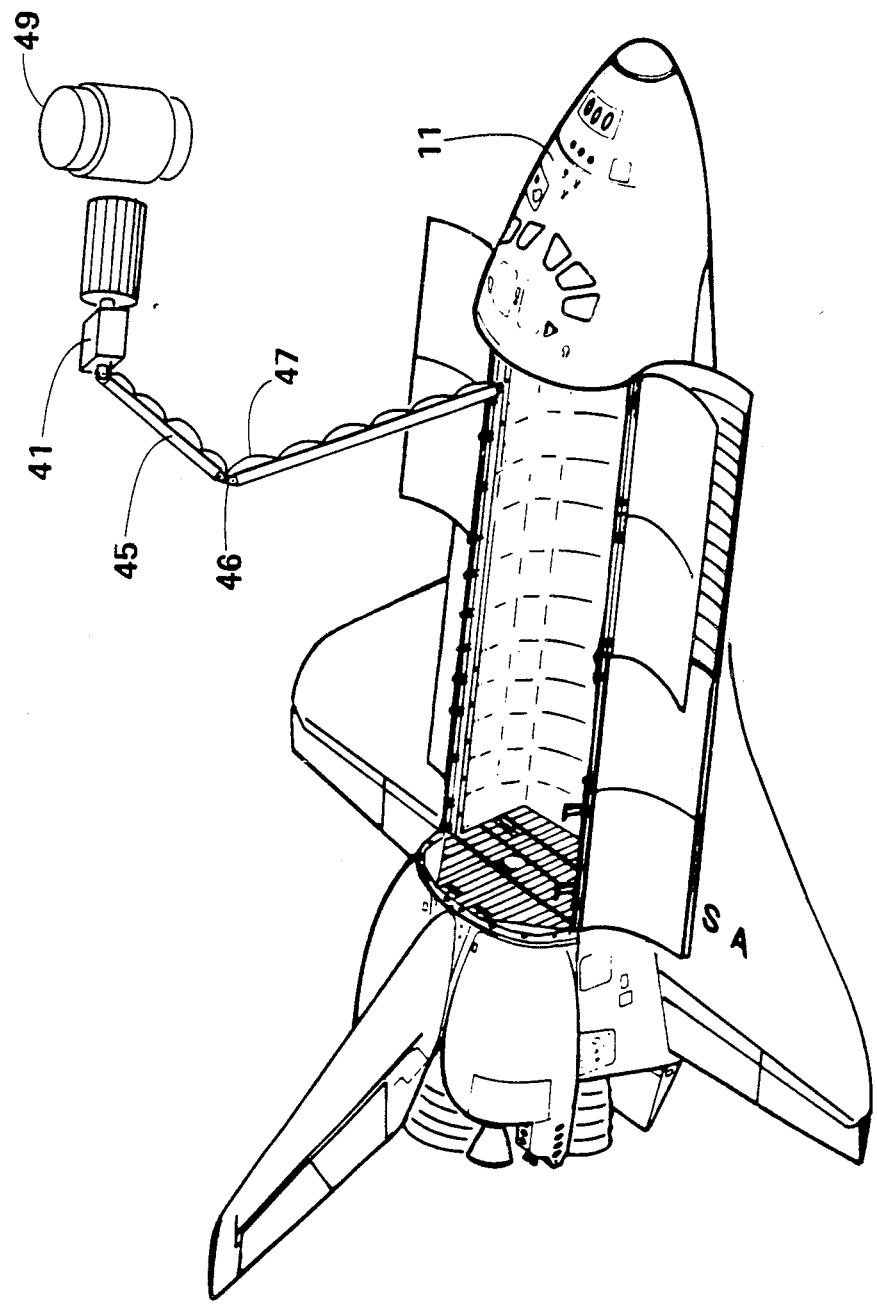
FIG. 4 is a pictorial view of a magnet system on the end of the remote manipulation arm of the space shuttle orbiter.

As an alternative to the loop 17 an electromagnet 41 as shown in FIG. 4 may be used which is held by the remote manipulation articulated arm 45 of the space shuttle orbiter 11 and which has a power line 47 supported by the arm which leads to a suitable power supply (not shown) on the space shuttle orbiter 11. The arm 45 may be adjusted remotely through controls acting on its joints 46 to position the electromagnet 41 in various positions. With this arrangement, the electromagnet 41 is carried so it may be position it north-south magnetic axis perpendicular to the satellite's 49 axis of rotation or tumble. Thus, in FIG. 4, the electromagnet 41 is orientated a few feet from the spinning satellite 49 and perpendicular to its spinning axis so the spinning satellite cuts across the magnetic force field. This causes the circular eddy-current flow in the metal housing of the satellite which are normal to the magnetic field which results in a magnetic force being applied to the satellite 49 opposing its rotation.

Obviously, a regular permanent magnet may be substituted for the electromagnet 49, although such a magnet will be much heavier. Nevertheless, such a magnet may be useful since power and a power line would not be needed. A regular permanent magnet should have high magnetization such as that those made from a cobalt-rare earth alloy.

Because the counter-rotation force generated by the satellite spinning in the applied magnetic field of a magnet, it will be necessary for the space shuttle orbiter to use its orientation propulsion devices to keep the orbiter 11 in a stable position.

Further, it is now readily apparent that while the invention has been described using the space shuttle orbiter spacecraft 11, other spacecraft could be used such as a remote teleoperator spacecraft for positioning the magnet 49 or current loop 17 relative to the spinning or tumbling satellite.

While the best mode for carrying out the invention has been described, variations and modifications will be readily apparent to those skilled in the art and such changes may be made without departing from the scope of the following claims.

What is claimed is:

1. A method of slowly reducing the revolution rate of a fast spinning uncontrolled space object so that maintenance and service operations may be performed on the space object, said space object having a housing of electrical conductive material, comprising:

maneuvering a spacecraft having a mast supporting a strong magnetic field producing means adjacent said fast spinning uncontrolled space object, placing said magnetic field producing means in a position adjacent but apart from said space object to establish a strong magnetic field perpendicular to the spin axis of said space object thereby causing eddy-current flow in the housing of the space object which is normal to the magnetic field and magnetic torque forces acting in a direction opposing the spin of the space object;

holding said spacecraft in a fixed position relative to the space object to prevent any movement of the spacecraft by the magnetic torque forces opposing the spin of the space object thereby causing the magnetic torque forces to slowly reduce the revolution rate of the space object until that rate is achieved that permits maintenance and service operations of the space object to be safely carried out.

2. A method according to claim 1 wherein:
siad magentic field producing means is a coil of wire;
and said coil of wire is placed to encircle the space object so that the spin axis of the space object lies in the plane of the coil of wire.

3. A method according to claim 2 wherein;
said coil of sire includes an insulated outer jacket which holds a cryogenic fluid about said wire.

4. A method according to claim 1 wherein;
said magnetic field producing means is a magnet having its north-south magnetic axis perpendicular to the spin axis of the space object.

* * * * *